(12) United States Patent
Grez et al.

(10) Patent No.: US 9,147,149 B2
(45) Date of Patent: Sep. 29, 2015

(54) RFID TAG FOR A PERSONAL CARE APPLIANCE

(71) Applicant: L'Oréal, Paris (FR)

(72) Inventors: Joseph Grez, North Bend, WA (US); David Gunderson, Everett, WA (US)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 13/917,155

(22) Filed: Jun. 13, 2013

(65) Prior Publication Data

US 2014/0367470 A1 Dec. 18, 2014

(51) Int. Cl.
*G06K 19/02* (2006.01)
*G06K 19/077* (2006.01)

(52) U.S. Cl.
CPC .... *G06K 19/07758* (2013.01); *G06K 19/07724* (2013.01)

(58) Field of Classification Search
CPC ................. B42D 15/10; G07F 7/1008; G06K 19/07749; G06K 19/06037; G06K 7/14; G06Q 30/02; G06Q 20/341
USPC .................. 235/487, 492, 494, 375, 380, 382
IPC ... B42D 15/10; G07F 7/1008; G06K 19/07749, G06K 19/06037, 7/14; G06Q 30/02, 20/341
See application file for complete search history.

(56) References Cited

U.S. PATENT DOCUMENTS 7,404,522 B2 * 7/2008 Kawai ............................ 235/492

* cited by examiner

*Primary Examiner* — Karl D Frech
(74) *Attorney, Agent, or Firm* — Jensen & Puntigam, PS

(57) ABSTRACT

The laminated RFID tag, mountable to a part of a personal care appliance, has rounded corners or a round peripheral edge, which is adapted to prevent absorption of water or other solvents.

2 Claims, 6 Drawing Sheets

RFID TAG FOR A PERSONAL CARE APPLIANCE

TECHNICAL FIELD

This invention relates generally to RFID (radio frequency identification) tags, and more specifically relates to such tags designed to be used in challenging environmental conditions, such as in a facial (skin) cleansing appliance.

BACKGROUND OF THE INVENTION

RFID tags, usually in laminated form, are typically approximately 0.0007 inches thick, and typically have a square or rectangular configuration with sharp corners. An example of a conventional laminated RFID tag is shown in FIG. 1 at 10. Laminated RFID tags are used in a variety of applications, including wireless identification of workpieces. Such RFID tags when used in corrosive or wet locations are subject to failure by virtue of separation from the surface on which they are mounted and/or separation of layers within the RFID tag. Separation, i.e. delamination, often accelerates following some degree of initial delamination of the tag. The square corner RFID tag shown in FIG. 1 is thus typically not suitable or recommended for use in challenging conditions, such as for instance in a facial cleansing personal appliance, as failure of the adhesive bond is common, beginning at the corners of the tag.

A round, molded, plastic encapsulated tag, known as a puck tag, is referred to at 14 in FIG. 2. The puck tag, which typically has a thickness of approximately 0.10 inches, is sometimes recommended for use in challenging environmental conditions. While the puck tag does have some advantage over the conventional laminated RFID tag for certain environmental conditions, the puck tag has its own disadvantages, namely, weight, size and cost. Accordingly, even the round puck tags are not recommended for certain applications, including a resonant skin cleansing brush, where the additional weight would result in a resonance change.

Accordingly, it is desirable that an RFID tag be designed which will survive and operate well in challenging environmental conditions.

SUMMARY OF THE INVENTION

Accordingly, an RFID tag for a personal care appliance comprises: a laminated RFID tag mountable to a part of a personal care appliance, wherein the RFID tag has rounded corners or has a round peripheral edge, adapted to prevent absorption of water or other solvents along its edge.

BEST MODE FOR CARRYING OUT THE INVENTION

Figure 5:
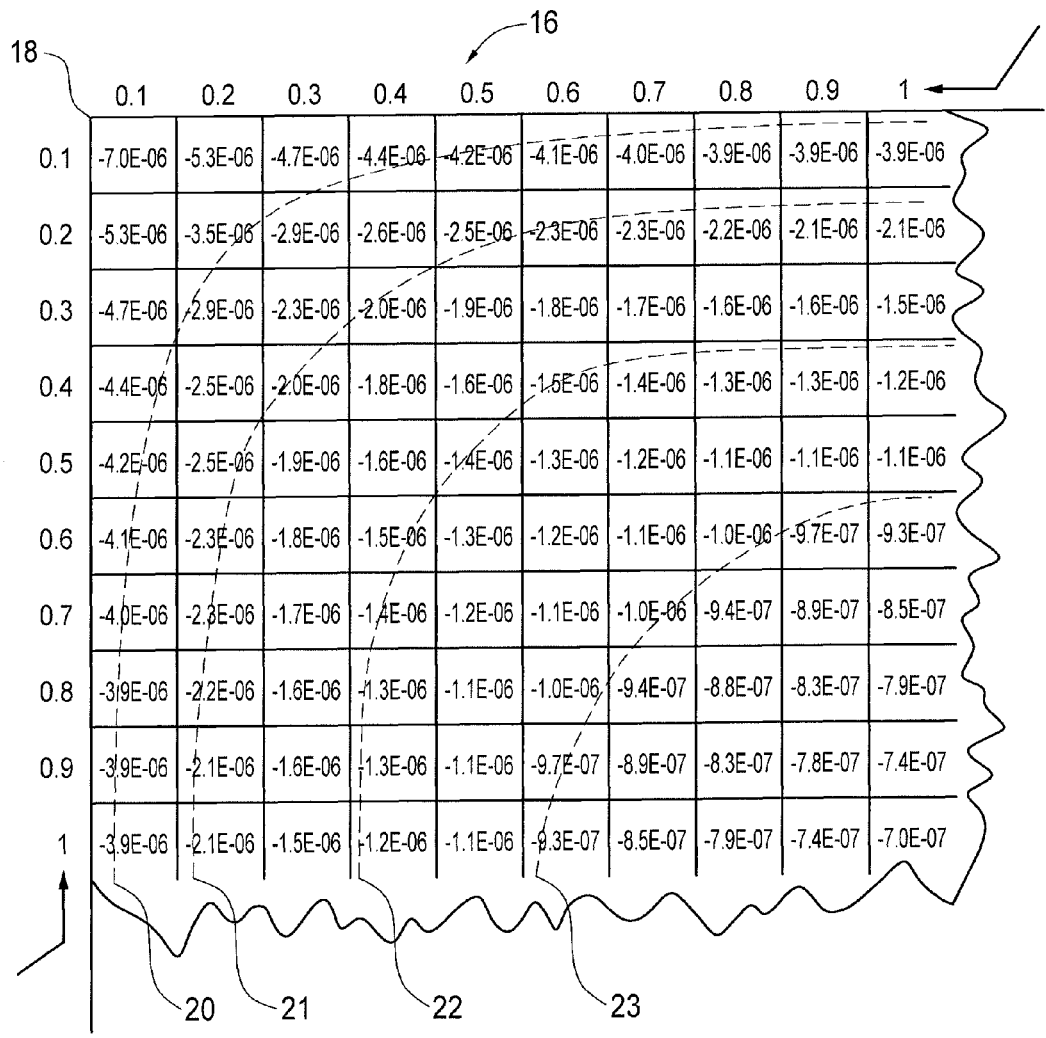
FIG. 5 is a representation of water uptake in grams per square centimeter as a function of distance from the left and right edges of a tag with square corners.

The present invention involves a new edge configuration for an RFID tag which is designed to operate well in challenging environmental conditions. It has been discovered by the inventors herein that the conventional laminated RFID tags often become delaminated due to failure of the adhesive bond between the tag and the mounting surface and the laminate structure itself in challenging conditions, such as those conditions which produce high solvent exposure and where there is vibration, with rinsing and drying operational cycles. It has further been discovered that with conventional RFID tags, delamination frequently begins at the existing sharp corners (12-12 in FIG. 1) of a tag because sharp corners of the tag are more susceptible to absorbance of solvents and therefore more susceptible in initial separation or delamination, leading to a more general failure of the lamination structure and/or the entire adhesive bond of the tag. FIG. 5 shows the top left portion (1 cm×1 cm) of a corner of a typical sharp cornered laminated RFID tag. The tag itself is referred to at 16, while the top left corner is referred to at 18. In FIG. 5, the numbers along the left and top side, respectively, indicate a vertical distance and a horizontal distance from the corner, in 0.1 cm increments. The values provided in each box represent the uptake of solvent to which the laminated structure may be exposed. While water is used in this particular example, other solvents such as detergent, alcohol or oils are examples of what the tag may be exposed to. While the particular values may vary due to a number of variables, such as temperature, exposure time and lamination thickness, among others, it does indicate that the individual quant lines 20, 21, 22 and 23 provide an indication that the corner is the most stressed portion of the tag relative to possible delamination.

Figure 3:
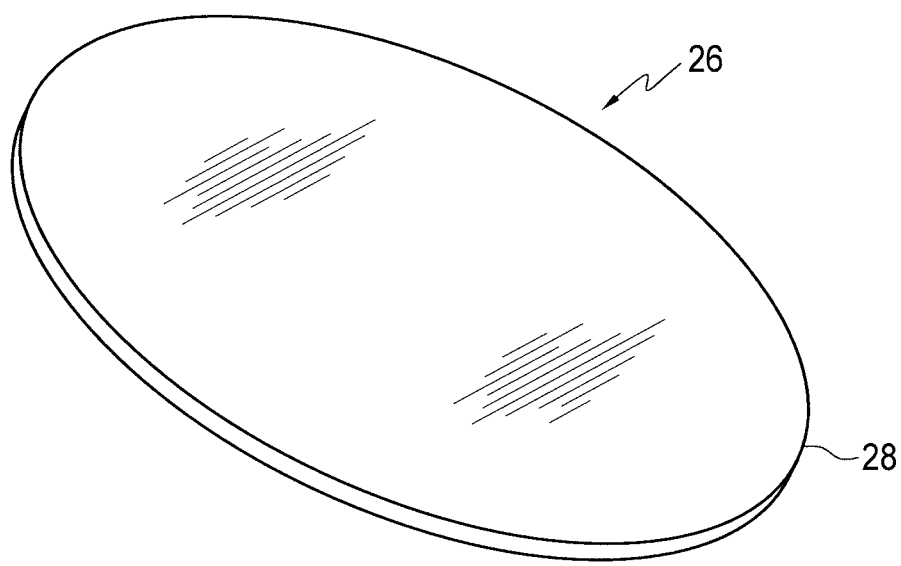
FIG. 3 is a perspective view of a round laminated RFID tag.

In the present invention, a laminated RFID tag has a round edge configuration, as shown at 26 in FIG. 3. The RFID tag 26, with edge 28, can be of various diameters, depending on the application. Further, conventional adhesives, such as acrylic adhesives, are used to attach/mount the RFID tag to a base surface, such as for instance, a replaceable brushhead in a skin cleansing appliance.

Figure 4:
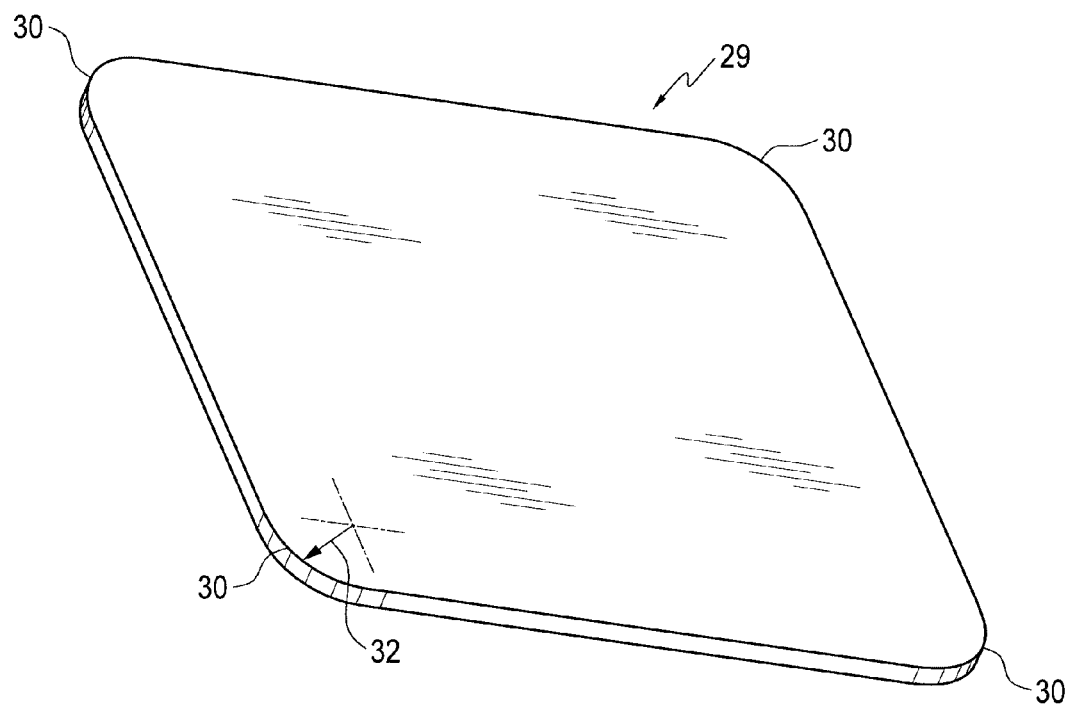
FIG. 4 is a perspective view of a laminated RFID tag with rounded corners.
Figure 6:
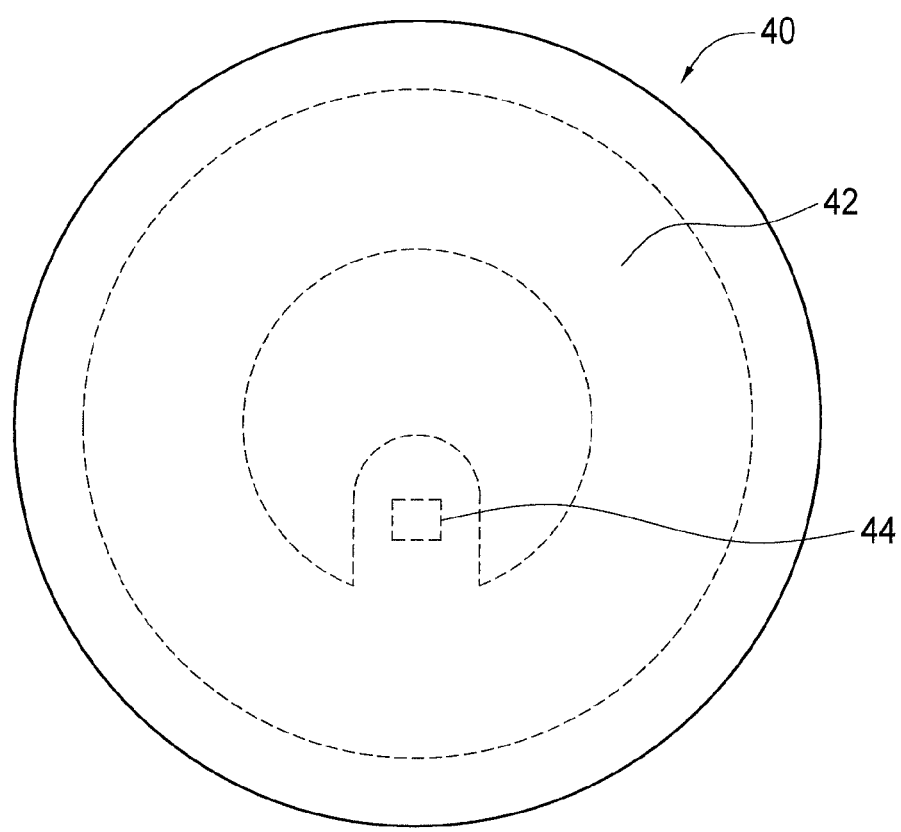
FIG. 6 is a perspective view of a round RFID tag showing the location of internal components.

FIG. 4 shows an alternative to the round laminated tag of FIG. 3. In FIG. 4, an RFID tag 29 has rounded corners. In this embodiment, the rounded corners 30-30 have a 2 mm radius, referred to at 32. Other radius sizes can be used, but all the corners should be rounded, to eliminate the sharp corners of conventional laminated RFID tags. FIG. 6 illustrates a round RFID tag 40 with a high tolerance positioning of the tag element, namely, antenna 42 and an RFID tag chip 44.

Figure 1:
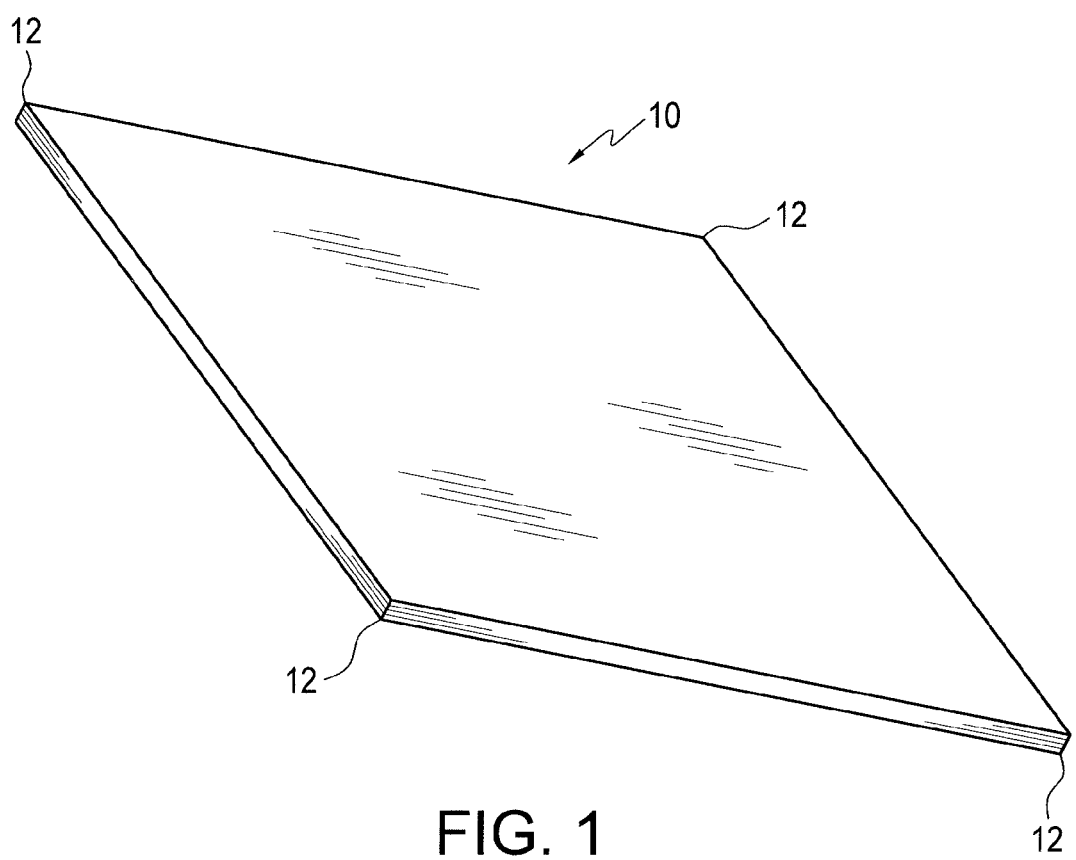
FIG. 1 is a perspective view of a conventional laminated tag with sharp corners.
Figure 2:
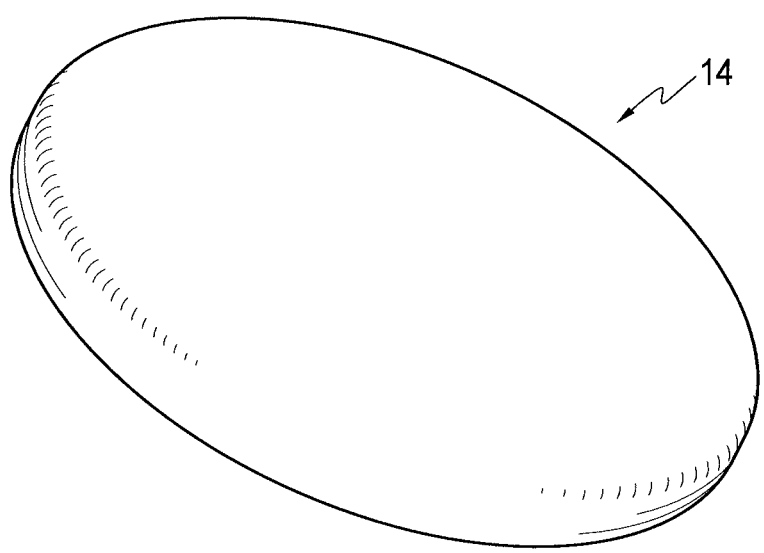
FIG. 2 is a perspective view of a conventional molded, plastic encapsulated tag, known also as a puck tag.

In testing the various RFID tags, it has been found that the round RFID tag of FIG. 3 survived well in challenging conditions, while the RFID tag with rounded corners of FIG. 4 also survived, although not as well as the round tag. The closer the edge configuration to a perfectly round configuration, the better the performance of the tag. The sharp cornered laminated tags, such as shown in FIG. 1, failed the test.

While the rounded tags or the tags with rounded corners may in particular instances be more expensive to produce, the tag is still advantageous due to its longer life and ability to survive in challenging conditions.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. An RFID tag for a personal care appliance, comprising:
a laminated RFID tag mountable to a part of a personal care appliance, wherein the RFID tag has all of its corners rounded, and wherein the rounded corners have an approximate radius of 2 mm, adapted to prevent absorption of water or other solvents along its edge.

2. The RFID tag of claim 1, wherein the rounded corners are configured to reduce delamination at the corners of the RFID tag.

* * * * *